(12) United States Patent
Lee

(10) Patent No.: US 8,475,005 B2
(45) Date of Patent: Jul. 2, 2013

(54) BACKLIGHT UNIT AND DISPLAY DEVICE INCLUDING THE SAME

(75) Inventor: Yong Hee Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 96 days.

(21) Appl. No.: 13/248,382

(22) Filed: Sep. 29, 2011

(65) Prior Publication Data

US 2012/0163018 A1 Jun. 28, 2012

(30) Foreign Application Priority Data

Dec. 24, 2010 (KR) .................. 10-2010-0134578

(51) Int. Cl.
*F21V 29/00* (2006.01)
(52) U.S. Cl.
USPC .......... 362/294; 362/97.3; 362/612; 362/630; 362/631; 315/57; 315/70; 349/58; 349/65; 349/69
(58) Field of Classification Search
USPC ................ 315/57, 70; 345/102, 212; 349/58, 349/65, 69; 362/97.1–97.3, 294, 373, 602, 362/609, 612, 630, 631
See application file for complete search history.

(56) References Cited

U.S. PATENT DOCUMENTS

| 7,834,840 B2 * | 11/2010 | Lee et al. ............ 345/102 |
| 2008/0116819 A1 | 5/2008 | Lee et al. |
| 2008/0291358 A1 | 11/2008 | Lee et al. |

FOREIGN PATENT DOCUMENTS

| KR | 10-2006-0028882 A | 4/2006 |
| KR | 10-2008-0044583 A | 5/2008 |
| KR | 10-2008-0102676 A | 11/2008 |
| KR | 10-2010-0130541 A | 12/2010 |

OTHER PUBLICATIONS

Office Action dated May 30, 2012 in Korean Application No. 10-2010-0134578, filed Dec. 24, 2010.
Notice of Allowance dated Nov. 30, 2012 in Korean Application No. 10-2010-0134578, filed Dec. 24, 2010.

* cited by examiner

*Primary Examiner* — Stephen F Husar
(74) *Attorney, Agent, or Firm* — Saliwanchik, Lloyd & Eisenschenk

(57) ABSTRACT

A backlight unit of an embodiment includes: a light emitting module including a plurality of light emitting diodes and a module substrate on which the light emitting diodes are mounted; a bottom cover accommodating the light emitting module; a board on the bottom cover; a transformer mounted on a lower portion of the board, and including a core and a coil surrounding at least one portion of the core; a transformer cover covering the transformer; and a heat dissipating cover between the transformer cover and the bottom cover.

14 Claims, 5 Drawing Sheets

BACKLIGHT UNIT AND DISPLAY DEVICE INCLUDING THE SAME

CROSS-REFERENCE TO RELATED APPLICATION

This application claims the benefit under 35 U.S.C. §119 of Korean Patent Application No. 10-2010-0134578, Dec. 24, 2010, which is hereby incorporated by reference in its entirety.

BACKGROUND

The present disclosure relates to a backlight unit and a display device including the backlight unit.

Recently, a lot of flat-panel display devices such as liquid crystal displays (LCDs), plasma display panel (PDP) displays, and organic light emitting diode (OLED) displays are under development to replace cathode ray tube (CRT) display devices.

Most LCDs are photo-detecting devices which display images by adjusting the amount of light inflow. Therefore, an additional light source, i.e., a backlight, is required to emit light onto a display panel.

Such a backlight unit supplies light from the rear surface of a display panel, and the transmission of the light emitted by the backlight unit can be adjusted by varying the arrangement of liquid crystals.

In general, such backlight units use eco-friendly light emitting diodes instead of fluorescent-type lamps as a light source. Such light emitting diodes can be made smaller, thinner and lighter and used for a longer period of time than fluorescent-type lamps.

BRIEF SUMMARY

Embodiments provide a backlight unit for blocking the leakage flux of a transformer, and a display device including the backlight unit.

Embodiments also provide a backlight unit which includes a heat dissipating cover between a transformer and a bottom cover, and a display device including the backlight unit.

Embodiments also provide a backlight unit which blocks the leakage flux transmitted from a transformer and disperses conductive heat with a heat dissipating cover attached to a transformer cover, and a display device including the backlight unit.

In one embodiment, a backlight unit includes: a light emitting module including a plurality of light emitting diodes and a module substrate on which the light emitting diodes are mounted; a bottom cover accommodating the light emitting module; a board on the bottom cover; a transformer mounted on a lower portion of the board, and including a core and a coil surrounding at least one portion of the core; a transformer cover covering the transformer; and a heat dissipating cover between the transformer cover and the bottom cover.

In another embodiment, a display device includes: a bottom cover; a board on the bottom cover; a transformer cover disposed between the bottom cover and the board and including a transformer mounted on the board; a heat dissipating cover adhered to a lower surface of the transformer cover, and covering the transformer; a reflection plate on the board; an optical member comprising a light guide plate on the reflection plate; a light emitting module comprising a light emitting diode on at least one side of the light guide plate; a display panel on the optical member; and a top cover on the display panel.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings.

A backlight unit and a display device including the backlight unit according to an embodiment are described hereinafter with reference to FIGS. 1 to 4.

Figure 1:
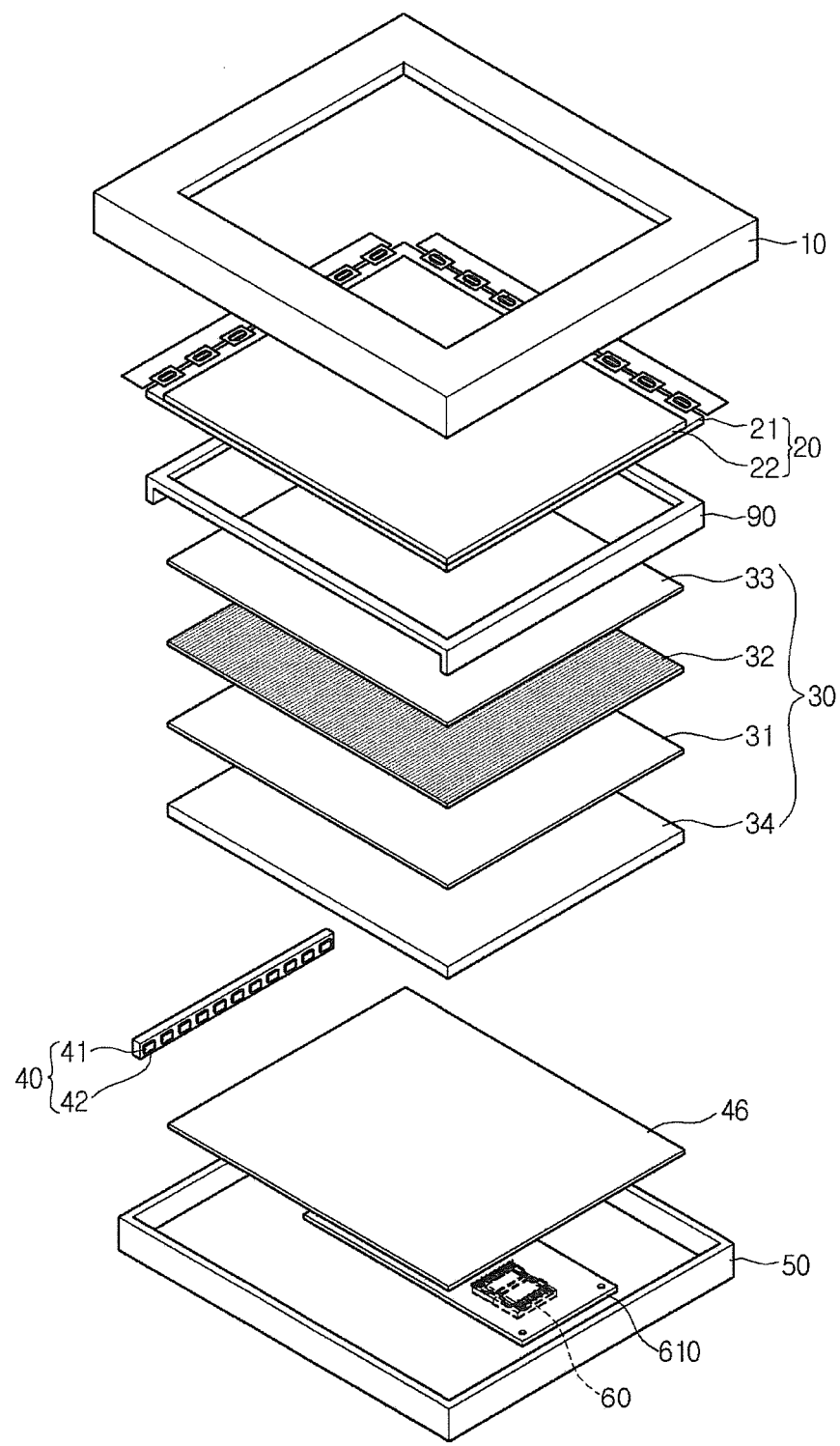
FIG. 1 is an exploded perspective view illustrating a display device according to an embodiment.

Referring to FIG. 1, a display device 100 includes a display panel 20, an optical member 30, a light emitting module 40 disposed on at least one side of the optical member 30, a reflection plate 46 disposed under the optical member 30, and a board 610 and a power unit 60 disposed under the reflection plate 46. The display panel 20 is placed on a panel supporting mold 90. All of the abovementioned components of the current embodiment are accommodated between a top cover 10 and a bottom cover 50.

The display panel 20 includes a first substrate 21 provided with thin film transistors, and a second substrate 22 facing the first substrate 21. A liquid crystal layer (not illustrated) is disposed between the first substrate 21 and the second substrate 22. The display panel 20 forms an image by adjusting molecular arrangement of the liquid crystal layer. However, since the display panel 20 is a non-light emitting device, the display panel 20 needs light emitted from the light emitting module 40 disposed at the rear side of the display panel 20.

One side of the first substrate 21 and another side of the first substrate 21 are provided with a printed circuit board (PCB) and a driver input circuit (DIC) mounted on the PCB.

The optical member 30 disposed under the display panel 20 includes a diffusion film 31, a prism film 32, a protection film 33, and a light guide plate 34.

The diffusion film 31 diffuses light incident through the light guide plate 34. Triangular prisms are arrayed in a predetermined pattern on an upper surface of the prism film 32. The prism film 32 concentrates the light diffused by the diffusion film 31, in a direction perpendicular to a flat surface of the display panel 20 disposed over the prism film 32. Two sheets of the prism film 32 may be used, and the microprism disposed at each of the two sheets of the prism film 32 have a predetermined angle. The light passing through the prism film 32 progresses vertically in almost every case to provide an even distribution of brightness. The protection film 33, disposed at an uppermost position, protects the prism film 32, which is vulnerable to scratches. Either of the diffusion film 31 and the prism film 32 may be removed.

The light guide plate 34 disposed under the diffusion film 31 may include one of an acrylic resin such as polymethyl methacrylate (PMMA), polyethylene terephthalate (PET), polycarbonate (PC), cycloolefin copolymer (COC), and polyethylene naphthalate (PEN).

A diffusing agent may be scattered in the light guide plate 34 or a diffusing agent layer may be coated on the outer surface of the light guide plate 34. Since the light guide plate 34 is relatively thick and thus has a relatively high strength, the distance between the light guide plate 34 and the reflection plate 46 can be maintained at a constant level.

The light emitting module 40 includes a module substrate 41 and a plurality of light emitting diodes 42, and the module substrate 41 includes a metal core PCB, a ceramic substrate, and a substrate formed of resin. A pattern is formed on one surface of the module substrate 41, and the pattern connects the light emitting diodes 42 electrically. At least two of the light emitting diodes 42 may be connected in series and/or in parallel and the number is not limited thereto. The light emitting diodes 42 may visible-band lights such as red, blue, and white lights.

The light emitting module 40 may be disposed on at least one side of the light guide plate 34, and provides a point light source to the side of the light guide plate 34.

The light emitting diodes 42, two or more in number, are disposed correspondingly along the side of the light guide plate 34. The light emitting diodes 42 may be disposed across the bottom cover 50 providing a top-view light. In this case, the light guide plate 34 may be removed.

The reflection plate 46 is disposed under the light guide plate 34 to reflect the light facing downward again and supply the light to the light guide plate 34. The reflection plate 46 may be formed of plastic such as PET or PC.

The board 610 is disposed at the rear surface of the reflection plate 46, and the power unit 60 is coupled with the rear surface of the board 610 to supply power to drive the light emitting diode 42. The power unit 60 includes a transformer, and the transformer is covered by a transformer cover. The transformer cover is formed of plastic for cost reduction, weight reduction, and the removal of magnetic field interference. The transformer cover is disposed between the board 610 and the bottom cover 50, and coupled with the lower portion of the board.

The output port of the transformer cover is connected to the driver of the light emitting diode 42 via an electric wire (not illustrated) to supply power. An inverter is not necessary because the light emitting diode 42 does not use alternating current (AC). Unnecessary is an inverter circuit which converts the AC of a commercial power source to direct current (DC) and makes the converted DC into a high-frequency AC. Also, the size of the transformer can be reduced because high voltage is unnecessary.

The reflection plate 46 and the optical member 30 are coupled inside the bottom cover 50 before the display panel 20 is coupled. Then, the top cover 10 is coupled.

The bottom cover 50 includes a metal material. The thinner the display device 100 using the light emitting diode 40, the narrower a space for a heat sink plate dispersing the heat generated by the light emitting diode 40. Therefore, the bottom cover 50, formed of a metal material with advanced heat sink characteristics, allows the heat generated inside to be dispersed while supporting the display device in entirety. The bottom cover 50 may include a non-metallic material and the material is not limited thereto.

The power unit 60 is described hereinafter with reference to FIGS. 2 to 4.

Figure 2:
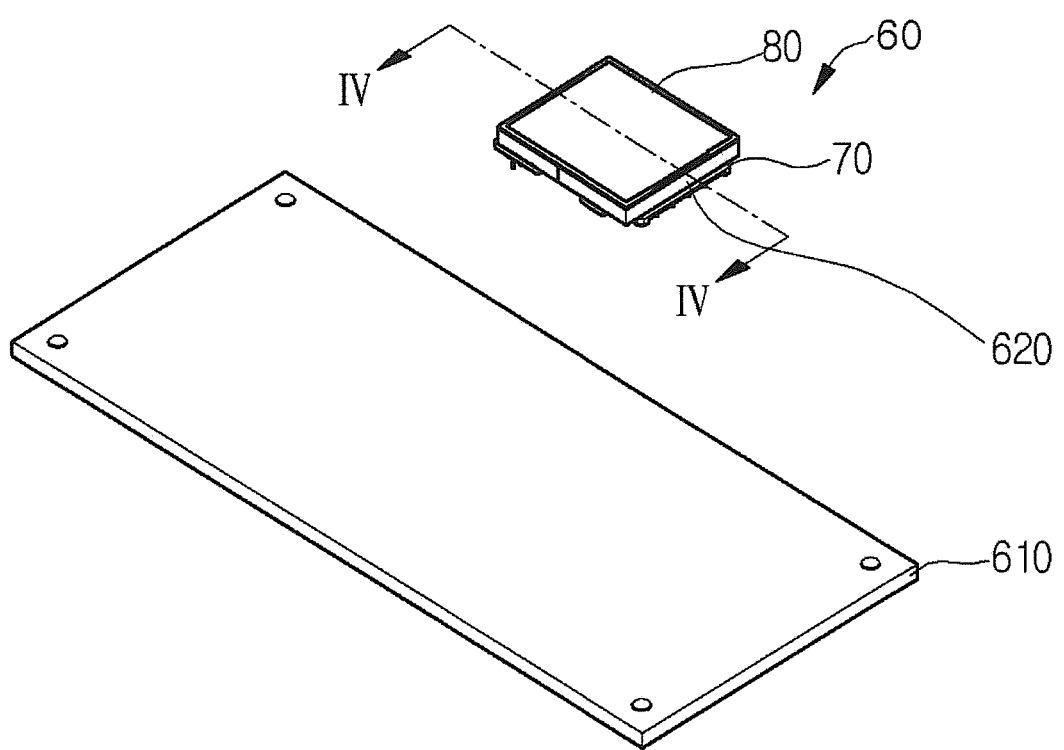
FIG. 2 is a perspective view illustrating an example of how a power unit of FIG. 1 is assembled.

Referring to FIG. 2, the power unit 60 includes a transformer 620, a transformer cover 70, and a heat dissipating cover 80.

A part of the transformer 620 is covered by the transformer cover 70 and coupled with the board 610. An integrated circuit (not illustrated) is disposed at the board 610 to control the transformer 620.

The transformer 620 converts the voltage of the DC power source supplied by the board 610 into an AC power source and then into the voltage of a DC power source again. The transformer 620 includes an input pin (not illustrated) and an output pin (not illustrated) connected to a coil 640, and the pins are soldered to the board 610. The transformer 620, which supplies the voltage of a DC power source necessary for the light emitting diode, reduces the voltage of the DC power source, outputs the DC power source as an AC power source, and rectifies it through a rectifier.

The heat dissipating cover 80 is disposed on the transformer cover 70. The heat dissipating cover 80, which may be a shielding heat dissipating cover, may be formed of a metal plate, and may include aluminum or an alloy including aluminum. The heat dissipating cover 80 may be larger than the transformer 620 in size, blocking the leakage flux generated by the transformer 620 effectively. The heat dissipating cover 80 disperses the heat directly generated by the transformer 620, and disperses the heat indirectly generated by the leakage flux of the transformer 620 effectively. The indirectly generated heat is an energy combining the reluctance of the heat dissipating cover 80 with the flux of the leakage flux. The overall system efficiency increases through the dispersal of the heat energy.

Figure 3:
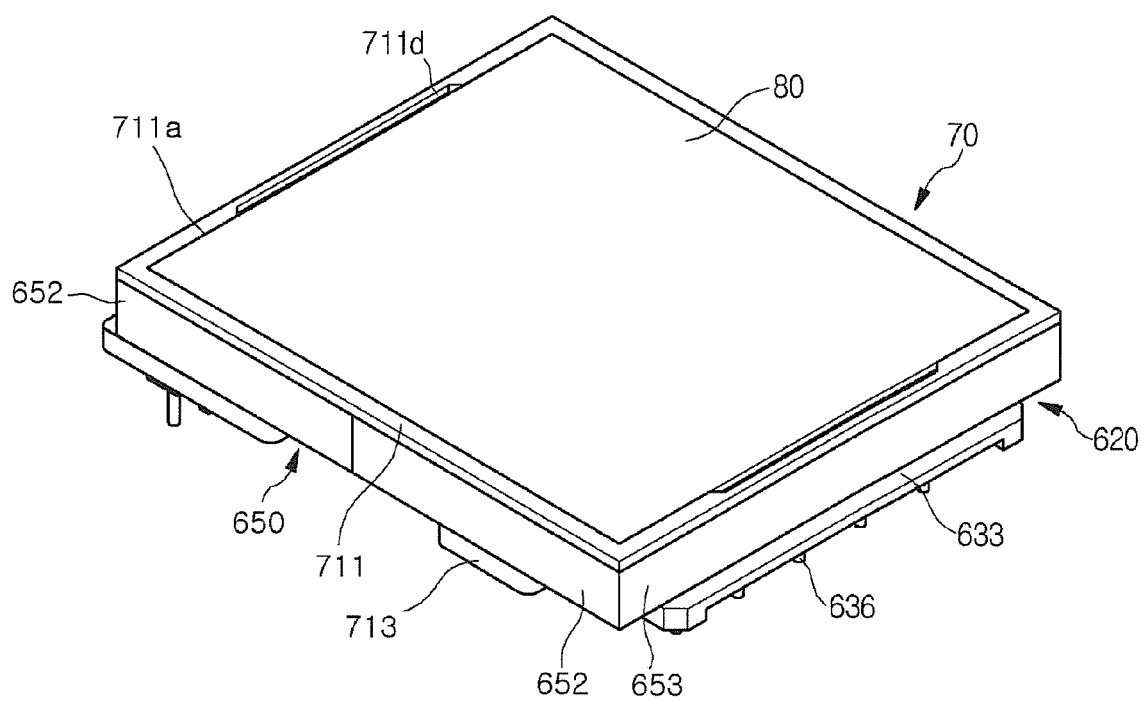
FIG. 3 is an exploded perspective view illustrating the power unit of FIG. 1.

Referring to FIG. 3, a first cover 711 and a second cover 713 are disposed at upper and lower sides of the transformer cover 70, respectively. The transformer 620 is coupled between the first cover 711 and the second cover 713. A second core part 652 and a third core part 653 of a core 650 are disposed along the circumference of the transformer cover 70. A pin 636 is disposed below extensions 633 extending from both sides of the second cover 713.

The heat dissipating cover 80 is disposed on the first cover 711 of the transformer cover 70. A holder 711a is disposed on the first cover 711 of the transformer cover 70. The holder 711a may have the form of a recess or groove stepped concavely from an upper surface of the first cover 711 toward the coil, and may be almost the same as the heat dissipating cover 80 in size. The heat dissipating cover 80 may be glued to the holder 711a of the first cover 711.

A part 711d of the holder 711a further includes a groove for the coupling and separation of the heat dissipating cover 80. The part 711d of the holder 711a, which may be disposed at the inner side of at least one side surface, is connected to the holder 711a.

The depth of the holder 711a may be the same as or different from the thickness of the heat dissipating cover 80. The thickness of the heatproof cover 80 may be at least 0.1 mm, but is not limited thereto.

The heat dissipating cover 80 may have a size enough to cover the core 650.

The heat dissipating cover 80 and the transformer 70 coupled with the transformer 620 may be fastened as a single unit by taping the circumference. The direction of the taping may be perpendicular to the direction in which the core 650 is inserted.

Figure 4:
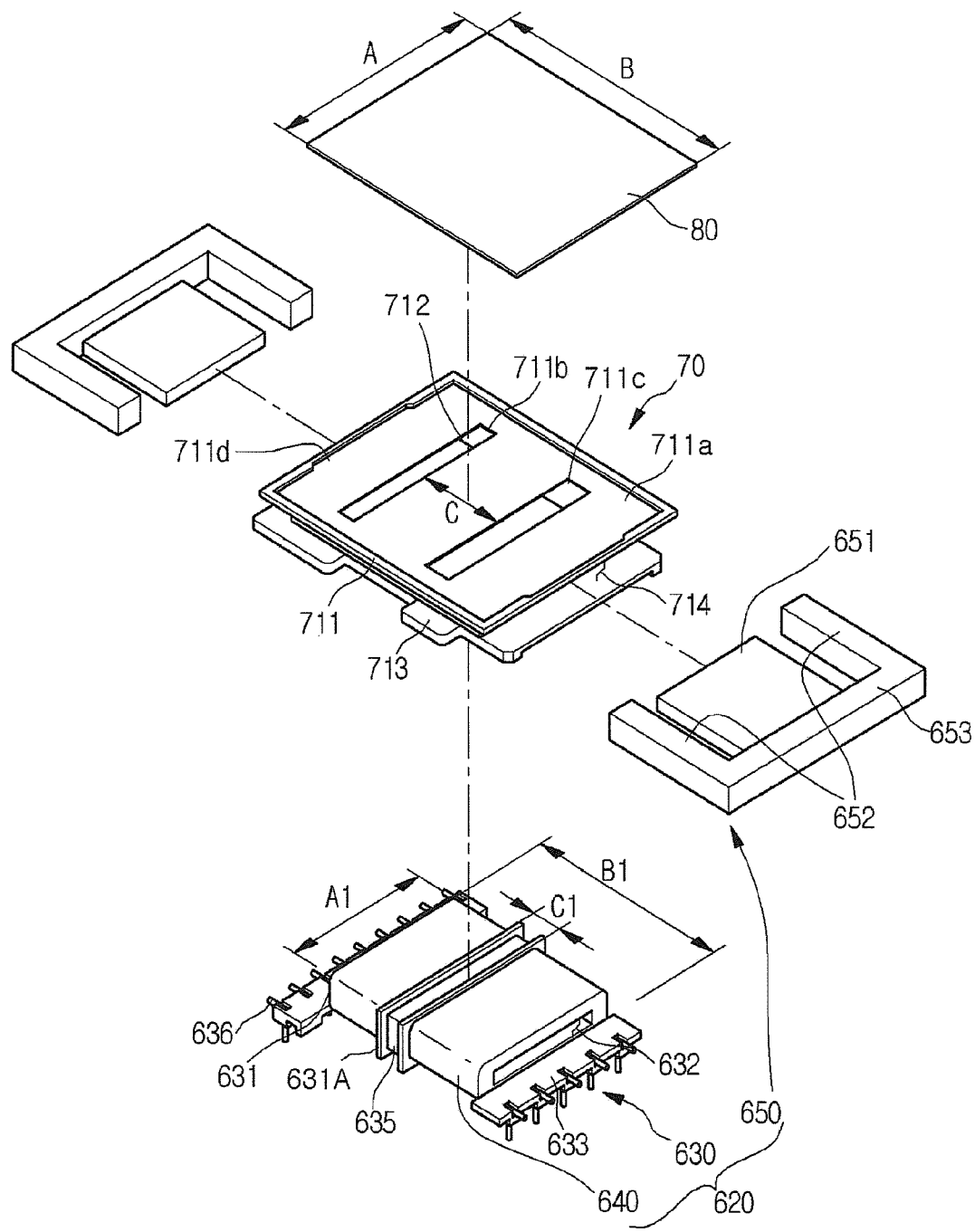
FIG. 4 is an exploded perspective view of FIG. 3.
Figure 5:
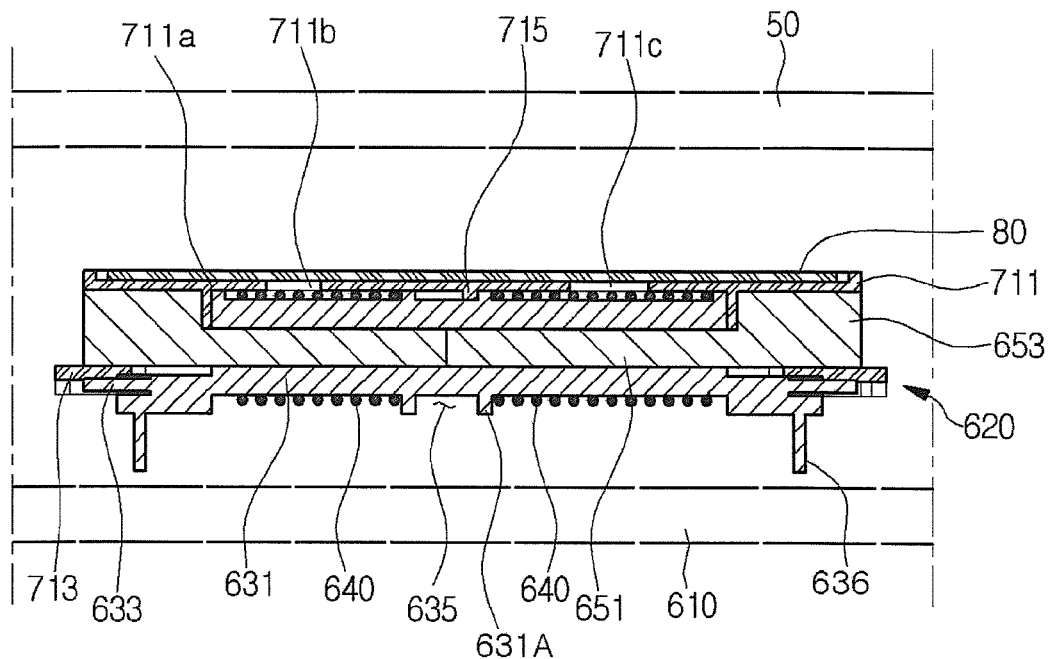
FIG. 5 is a sectional view taken along line IV-IV of FIG. 2.

Referring to FIGS. 4 and 5, the transformer 620 includes a bobbin 630, the coil 640, and the core 650.

The bobbin 630, formed of plastic, includes a body 631 and an extension part 633. The coil 640 is wound along the outer surface of the body 631, and the extension part 633 is for the coupling with the board.

The body 631 has the shape of a long square tube, and a core holder 632 receiving a part of the core 650 is disposed in the body 631. A part of the body 631 protrudes in an outside direction.

The core 650 is formed of a metal such as iron, and may have an E shape but the shape is not limited thereto. The core 650, which guides the leakage flux, includes a first core part 651, a pair of the second core parts 652, and a pair of the third core part 653.

The first core part 651 is accommodated by the core holder 632 of the bobbin 630, and thus the coil 640 surrounds the first core part 651. The second core part 652 is disposed outside the transformer 70. The third core part 653 connects the first core part 651 with the second core part 652. The core 650 is provided in a pair, and ends of the first core parts 651 face each other.

The lower surface of the first core part 651, like the lower surfaces of the second and third core parts 652 and 653, is flat, which facilitates the lower surface of the core 650 being coupled with the upper surface of the second cover 713. The upper surface of the first core part 651 forms a stepped structure with the upper surfaces of the second and third core parts 652 and 653. The first core part 651, which is thinner than the second and third core parts 652 and 653, is coupled with the core holder 632.

The transformer cover 70, formed of plastic, surrounds the transformer 620 and prevents foreign materials from entering the transformer 620.

The transformer cover 70 includes the first cover 711 and the second cover 713. The second cover 713 may be disposed in parallel with the board while the first cover 711 being disposed in parallel with the bottom cover. The transformer cover 70 further includes a side cover 712 between the first and second covers 711 and 713, and the side cover 712 is a cover to separate the coil of the transformer 70 from the second core part 652. The length and width of the side cover 712 are less than the length and width of the first cover 711, respectively. The edges of the first and second covers 711 and 713 may protrude from the side cover 712.

The side cover 712 is bent and extended in a perpendicular direction toward the second cover 713 from the first cover 711. The coil 640 is accommodated by a transformer holder 714 which is surrounded by the first and second covers 711 and 713. The second cover 713 is disposed in parallel with the first cover 711, and includes a rectangular cut part 713a so that the body 631 is accommodated by the transformer holder 714. The second core part 652 is disposed on the side cover 712.

The heat dissipating cover 80 may have a rectangular shape, and is received by the holder 711a disposed at the first cover 711.

A plurality of holes 711b and 711c are formed at the holder 711a of the transformer cover 70, and the holes 711b and 711c correspond to the centers of the coils 640 on both sides. The area A1*B1 of the coil 640 may be smaller than the area of the heat dissipating cover A*B, and thus the heat dissipating cover 80 can block the leakage flux generated by the coil effectively while dispersing the indirectly generated heat across the entire surface. The area of the heat dissipating cover 80 may have a size enough to cover the area of the core 650.

The holes 711b and 711c are formed in a direction parallel with the direction in which the coil 640 is wound. The holes 711b and 711c augment the heat dispersal at the center of the heat dissipating cover 80, preventing the heat dissipating cover 80 from expanding and lifting so that the heat dissipating cover 80 is adhered evenly to the holder 711a.

The holes 711b and 711c may be the same to or different from each other in width, which is not limited thereto.

A clearance part 635 is disposed at the center of the bobbin 630. The clearance part 635 is an area where the coil 640 is not wound. First guide projections 631A are disposed between the clearance part 635 and both coils 640. At least one of the first guide projections 631A is guided along the outer surface of a second guide projection 715 (refer to FIG. 4) disposed at the inner center of the transformer 70, facilitating the coupling between the transformer holder 714 and the bobbin 630. The first guide projection 631A of the bobbin 630 can prevent the bobbin 630 from sliding from side to side.

The distance C1 between the first guide projections 631A may be shorter than the distance C between the holes 711b and 711c.

Described hereinafter is the process in which the transformer 620, the transformer cover 70, and the heat dissipating cover 80 are combined.

First, the coil 640 is wound along the body 631 of the bobbin 630, and the bobbin 630 is coupled with the board 610 by using the extension part 633. Then, the body 631 of the bobbin 630 with the coil wound is accommodated by the transformer holder 714 of the transformer cover 70. During this process, the body 631 passes through the cut part 713a of the second cover 713. The body 613 of the bobbin 630 may be received by the transformer holder 714 in part.

Here, the first guide projections 631A disposed between the coils 640 at both sides of the bobbin 630 may be guided by the outer surfaces of the second guide projections 715 (refer to FIG. 4) disposed at the inner center of the transformer cover 70, facilitating the coupling between the transformer holder 714 and the bobbin 630. The first guide projections 631A of the bobbin 630 can prevent the bobbin 630 from sliding from side to side.

Next, the first core part 651 is inserted into the core holder 632. During this process, the second core part 652 is disposed on the second cover 713. The side cover 712 separates the second core part 652 from the coil 640.

The heat dissipating cover 80 is attached to the transformer cover 70 before or after the abovementioned assembly process.

The pin 636 disposed at the body 631 of the bobbin 630 is soldered to the board 610, the transformer 70 is coupled with the board 610, and the bottom cover 50 faces the transformer cover 70 on the transformer cover 70.

Figure 6:
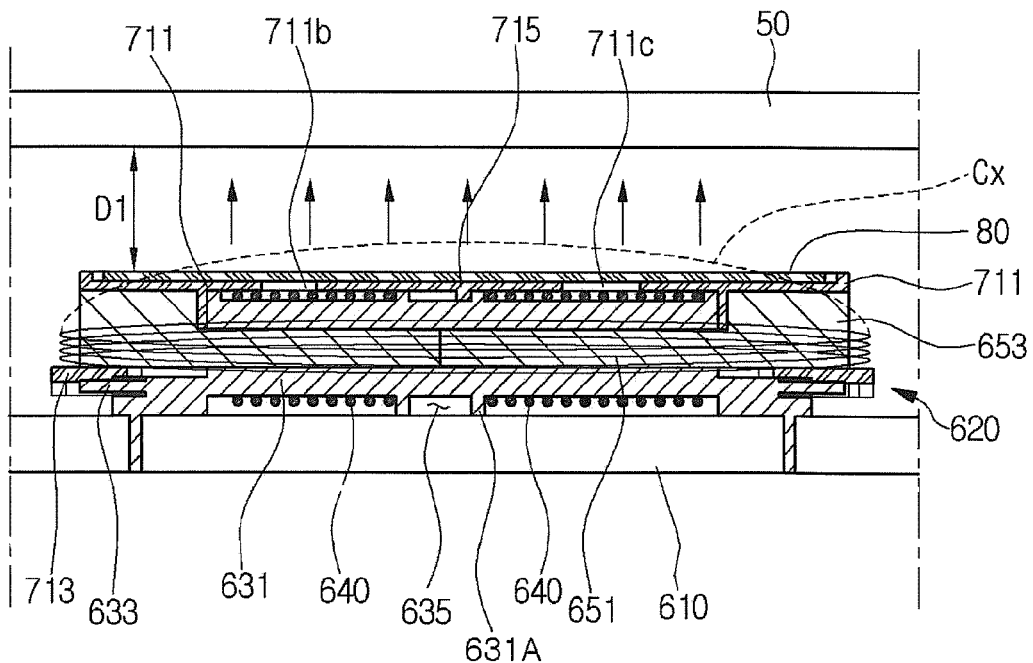
FIG. 6 is a view illustrating the flow of a leakage flux and heat generated by a transformer of an embodiment.

Referring to FIG. 6, the heat dissipating cover 80, which has a size enough to cover the coil 640, is disposed at an upper part of the coil 640 of the transformer 620, can block or absorb the line of magnetic force or leakage flux Cx generated by the transformer 620, and can block the leakage flux Cx from being transmitted to the bottom cover 50. Also, the heat dissipating cover 80 disperses the heat generated by the leakage flux and transmitted from the transformer 620. Therefore, the heat dissipating cover 80 can block the leakage flux which may be transmitted to the bottom cover 50 effectively, and reduce the heat dispersal of the bottom cover 50.

Also, the heat dispersal efficiency can further increase by forming more of the holes 711c and 711d at the holder 711a of the transformer cover 70, connecting the heat dissipating cover 80 with the coil 640, and reducing the area of the surface in contact with the holder 711a.

The bottom cover 50 may be separated at a predetermined distance D1 from or in contact with the heat dissipating cover 80, which is not limited thereto.

The heat dissipating cover 80 may be provided in plurality and have a size corresponding to the size of each of the coils 640, which is not limited thereto.

The heat dissipating cover 80 may be attached to the inner side of the bottom cover, which is not limited thereto.

According to the embodiments, the leakage flux generated by the backlight unit in the bottom cover can be blocked.

According to the embodiments, the heat transfer caused by the leakage flux generated by the backlight unit can be blocked.

According to the embodiments, the reliability of the backlight unit and a display device can be improved by blocking heat from being transferred to the bottom cover in the display device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a light emitting module including a plurality of light emitting diodes and a module substrate on which the light emitting diodes are mounted;
   a bottom cover accommodating the light emitting module;
   a board on the bottom cover;
   a transformer mounted on a lower portion of the board, and including a core and a coil surrounding at least one portion of the core;
   a transformer cover covering the transformer; and
   a heat dissipating cover between the transformer cover and the bottom cover.

2. The backlight unit according to claim 1, wherein the heat dissipating cover includes aluminum or an alloy including aluminum.

3. The backlight unit according to claim 1, wherein the heat dissipating cover is adhered to a lower surface of the transformer cover which faces the bottom cover.

4. The backlight unit according to claim 1, wherein the heat dissipating cover has a surface area covering the coil and the cover.

5. The backlight unit according to claim 1, wherein the transformer cover includes a holder the heat dissipating cover is attached to.

6. The backlight unit according to claim 5, wherein the transformer cover further includes a groove, which is connected to the holder, on at least one side of the holder to separate the heat dissipating cover.

7. The backlight unit according to claim 5, wherein the holder of the transformer includes a plurality of holes, each of the holes corresponding to the coil.

8. The backlight unit according to claim 1, wherein a first cover spaced apart from the bottom cover to receive the heat dissipating cover, a second cover facing the board and coupled with the transformer, and the core disposed between the first cover and the second cover in a vertically bent shape are disposed at the transformer cover.

9. The backlight unit according to claim 8, comprising:
   a bobbin, each of whose sides is wound with the coil;
   a clearance part between the coils at both sides of the bobbin;
   and first guide projections disposed at both sides of the clearance part.

10. The backlight unit according to claim 9, wherein the transformer cover further includes a second guide projection, which comes into contact with an inner side of either of the first guide projections of the bobbin, in an inner side of the transformer cover.

11. The backlight unit according to claim 9, wherein the bobbin and the transformer cover include a plastic substance.

12. The backlight unit according to claim 1, comprising an optical member including a reflection plate 46 disposed on the board and a light guide plate disposed on the reflection plate,
   wherein the light emitting diodes of the light emitting module are disposed on at least one side of the light guide plate.

13. A display device comprising:
   a bottom cover;
   a board on the bottom cover;
   a transformer cover disposed between the bottom cover and the board and including a transformer mounted on the board;
   a heat dissipating cover adhered to a lower surface of the transformer cover, and covering the transformer;
   a reflection plate on the board;
   an optical member comprising a light guide plate on the reflection plate;
   a light emitting module comprising a light emitting diode on at least one side of the light guide plate;
   a display panel on the optical member; and
   a top cover on the display panel.

14. The display device according to claim 13, wherein the heat dissipating cover is an aluminum plate having an area wider than a core area of the transformer.

* * * * *